United States Patent
Chen

(10) Patent No.: US 7,259,950 B2
(45) Date of Patent: Aug. 21, 2007

(54) LOAD-PROTECTION CONTROL CIRCUIT OF POWER SUPPLY

(75) Inventor: Michael Chen, Taipei Hsien (TW)

(73) Assignee: Topower Computer Industrial Co., Ltd., Taipei Hsien (TW)

( * ) Notice: Subject to any disclaimer, the term of this patent is extended or adjusted under 35 U.S.C. 154(b) by 0 days.

(21) Appl. No.: 11/049,745

(22) Filed: Feb. 4, 2005

(65) Prior Publication Data

US 2006/0176633 A1  Aug. 10, 2006

(51) Int. Cl.
*H02H 3/00* (2006.01)
*H02H 3/08* (2006.01)

(52) U.S. Cl. .............. 361/93.1; 361/98; 307/139; 307/141.8; 700/293

(58) Field of Classification Search ........... 361/79, 361/93.1, 98; 307/141.8, 700, 139; 700/293
See application file for complete search history.

(56) References Cited

U.S. PATENT DOCUMENTS

| | | | | |
|---|---|---|---|---|
| 4,536,814 A | * | 8/1985 | Theisen et al. | 361/7 |
| 5,185,734 A | * | 2/1993 | Call et al. | 369/116 |
| 5,438,499 A | * | 8/1995 | Bonte et al. | 363/21.16 |
| 6,104,583 A | * | 8/2000 | Wynn et al. | 361/7 |
| 2003/0210007 A1 | * | 11/2003 | Hsu et al. | 318/440 |
| 2005/0002133 A1 | * | 1/2005 | Nam | 361/18 |

* cited by examiner

*Primary Examiner*—Brian Sircus
*Assistant Examiner*—Z Kitov
(74) *Attorney, Agent, or Firm*—Birch, Stewart, Kolasch & Birch, LLP

(57) ABSTRACT

A load-protection control circuit of a power supply, which applies to the power supply that has a maximum power-limiting function. The power supply includes a power transformation circuit which outputs a direct current to drive loads and a control circuit which can switch the power transformation circuit electrically coupled to a power-protection circuit that has a voltage representing reference power. The direct current voltage driving the load is compared with the voltage representing reference power by the power-protection circuit to output a protection signal to the control circuit for switching the power transformation circuit. The power-protection circuit and the control circuit are electrically connected to a switcher circuit connected to a switch, wherein the switch can switch the switcher circuit to be in open-circuit or close-circuit state in order to determine whether the protection signal is transmitted to the control circuit. Thereby, the objective of load-protection control is accomplished.

4 Claims, 3 Drawing Sheets

LOAD-PROTECTION CONTROL CIRCUIT OF POWER SUPPLY

FIELD OF THE INVENTION

The present invention relates to a load-protection control circuit of power supply, particularly to one, which applies to the power supply that has a maximum power-limiting function, and wherein the user can determine whether the maximum power-limiting function works or not.

BACKGROUND OF THE INVENTION

As the user demands higher and higher operating speed of the computer, the power required by the central processing unit and the peripheral devices grows correspondingly, and thus, the power supply used in the computer system needs to provide a higher power output; however, considering the harm that the electricity can do on the human body, the power supply has an energy-limiting standard for its output power, i.e. maximum output power (Max VA), which is usually 240VA in the current specification; thus, if the output voltage is 12V, the maximum output current will be 20A. For example, in SSI or UL, the electric device has an energy-hazard standard stipulating that maximum output power of a power supply is 240VA in order to protect the computer user's safety.

With the fast-increasing operating speed of the computer system and more and more peripheral devices connected thereto, if persisting in high-level safety standard, one have to pay for the expense of additional power output ports. Each power output port needs a power-protection circuit, and the manufacturer has to fabricate various specifications of power supplies with different power-protection circuits demanded by different systems, which besets the manufacturer very much, needless to mention the difficulty of the design of the power-protection circuit. Furthermore, many high-level peripheral devices require a power higher than that regulated by a protection standard, and the user has to adopt the power supply without protection function; thus, to meet the market demand, the power supply's manufacturer has to provide the power supply with high power output but without protection function, which farther raises the cost of design and fabrication and lacks economical profit.

SUMMARY OF THE INVENTION

The primary objective of the present invention is to provide a load-protection control circuit of power supply, wherein the user can determine whether the load-protection function works or not according to power demand. Further, the manufacturer of the power supply according to the present invention may only fabricate a unitary product, and furthermore, when installing high power peripheries, it is unnecessary for the user to adopt another specification's power supply.

To achieve the aforementioned objective, the present invention applies to a power supply having a maximum power-limiting function, which comprises at least: a power transformation circuit, which outputs a direct current to drive loads; and a control circuit, which can switch the power transformation circuit; wherein the power transformation circuit and the control circuit are coupled to a power-protection circuit, which has a voltage representing reference power. The direct current power that drives loads is compared with the voltage representing reference power by the power-protection circuit in order to output a protection signal to the control circuit for switching the power transformation circuit. In the present invention, the power-protection circuit and the control circuit are electrically connected to a switcher circuit, which is further connected to a switch, wherein the switch can switch the switcher circuit to be in open-circuit or close-circuit state in order to determine whether the protection signal is transmitted to the control circuit; thereby, the objective of controlling load protection is accomplished.

DETAILED DESCRIPTION OF THE PREFERRED EMBODIMENTS

The detailed description and the technical contents of the present invention, in cooperation with the drawings, are to be stated below.

Figure 1:
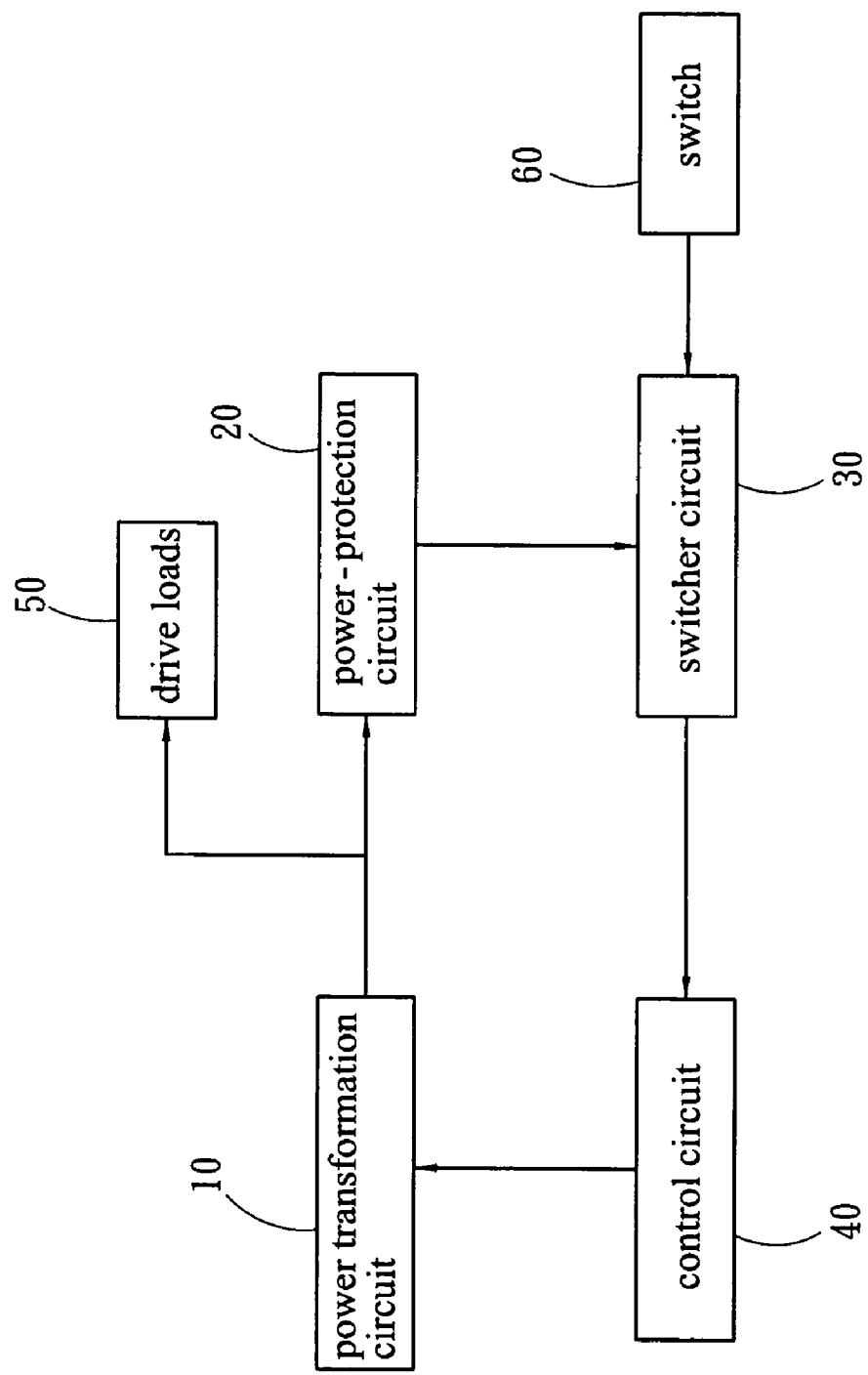
FIG. 1 is the schematic block diagram of the circuit according to the present invention.
Figure 2:
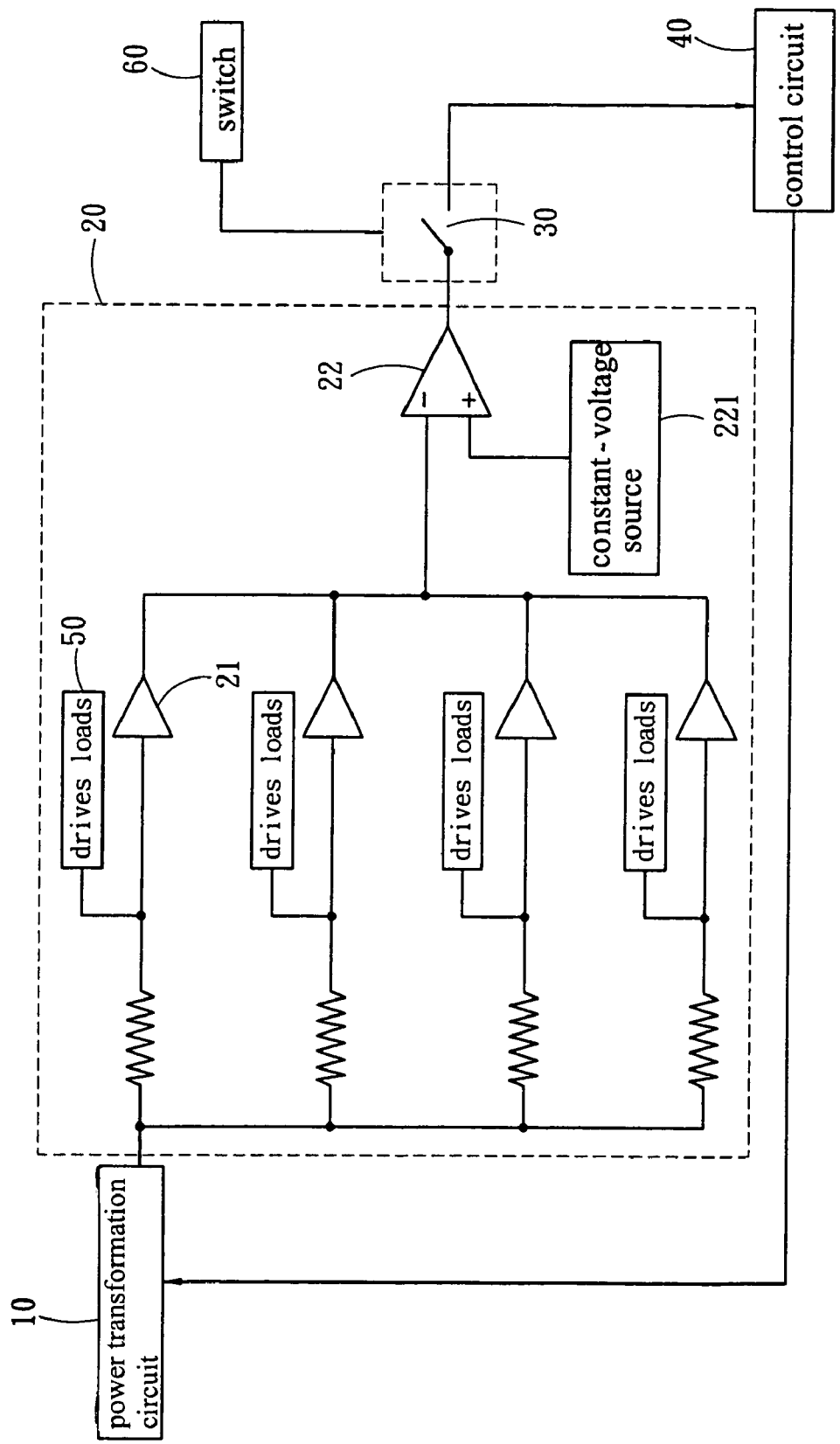
FIG. 2 is the schematic diagram of the circuit according to the embodiment of the present invention.

Refer to FIG. 1 the schematic block diagram of the circuit according to the present invention, and FIG. 2 the schematic diagram of the circuit according to the embodiment of the present invention. The power supply in the present invention comprises at least: a power transformation circuit 10, which outputs a direct current to drive loads 50; and a control circuit 40, which can switch the power transformation circuit 10, wherein the power transformation circuit 10 and the control circuit 40 are electrically coupled to a power-protection circuit 20, which has a reference power. The direct current power that drives loads 50 is compared with the voltage representing reference power by the power-protection circuit 20 in order to output a protection signal to the control circuit 40 for switching the power transformation circuit 10. In the present invention, the power-protection circuit 20 and the control circuit 40 are electrically connected to a switcher circuit 30, which is further connected to a switch 60, wherein the switch 60 can switch the switcher circuit 30 to be in open-circuit or close-circuit state in order to determine whether the protection signal is transmitted to the control circuit 40; thereby, the objective of controlling load protection is accomplished.

Figure 3:
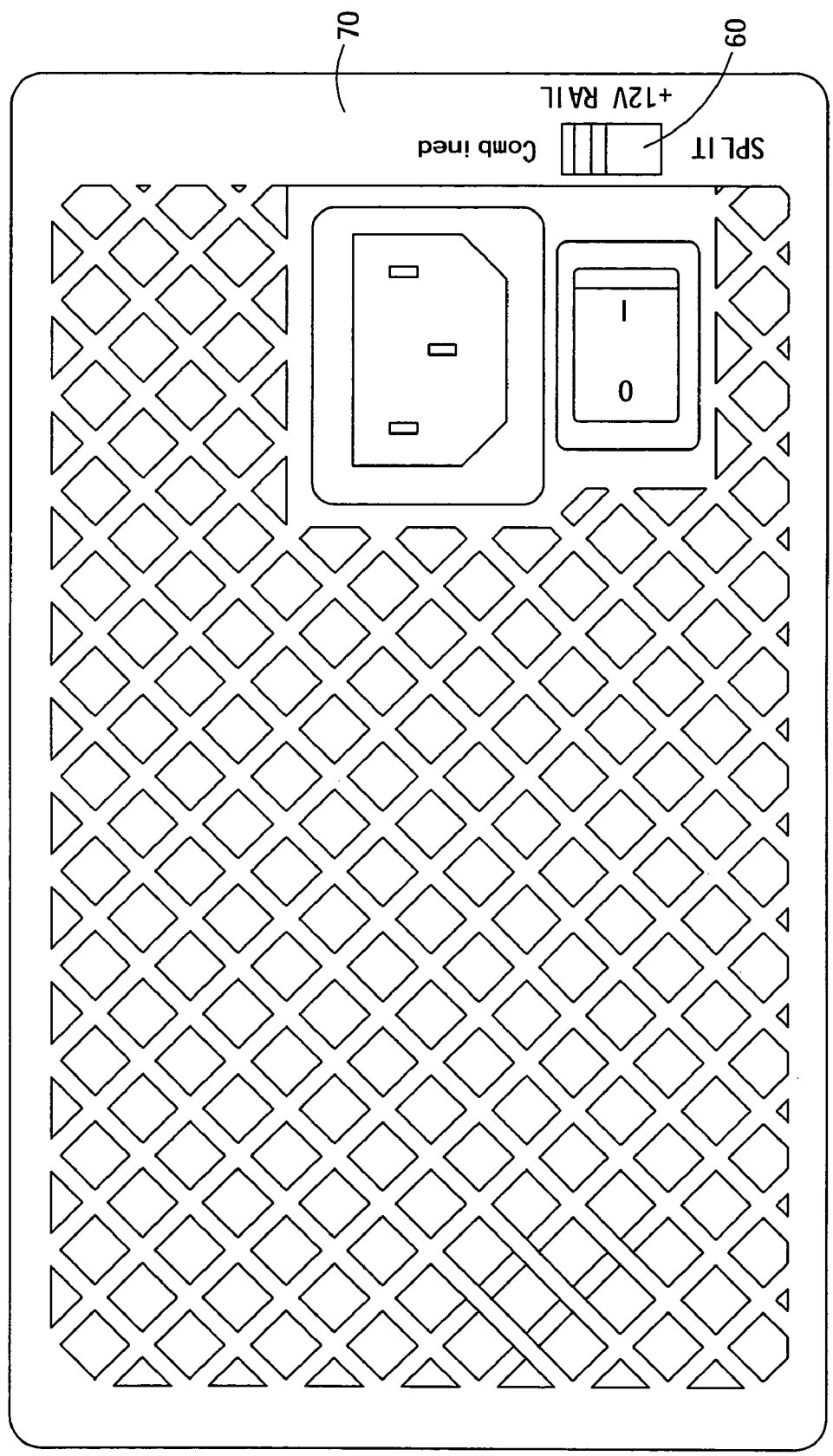
FIG. 3 is the schematic diagram showing that the switch is disposed on the panel of the housing of the present invention's power supply.

In FIG. 2, the present invention exemplified with the power-protection circuit 20 that adopts a constant-voltage source 221 as the voltage representing reference power. As there are various existing power-protection circuits 20 in the conventional technologies, the present invention may also apply to another power-protection circuit 20, such as that adopting a constant-current source as the signal representing reference power, or the equivalent circuit of the power-protection circuit 20. According to an embodiment of the present invention, the power-protection circuit 20 comprises a signal amplifier 21 and a comparator 22. When the control circuit 40 operates to enable the power transformation circuit 10 to convert the power and output a direct current to drive the loads 50, the drive current flowing through the power-protection circuit 20 will vary according to the power required by the loads 50; in the meanwhile, the direct currents flow through resistances, which are designated as R1 to R4, to the signal amplifiers 21. The signal amplifiers 21 convert input signals into output signals having values of power, which are then sent to the comparator 22. The comparator 22 compares the signal having values of power with the voltage representing reference power provided by the constant-voltage source 221 to obtain a protection signal, which is further sent to the control circuit 40 for determining whether the control circuit 40 closes or not. The control circuit 40 herein may be a pulse width modulator (PWM) with a protection function. In the present invention, a switcher circuit 30 is further installed on the path, through which the protection signal is transferred from the power-protection circuit 20 to the control circuit 40. The switcher circuit 30 is further coupled to a switch 60, which may be disposed on the panel 70 of the power supply's housing, as shown in FIG. 3. When the user operates the switch 60 to select the protection function of the power supply, the switcher circuit 30 will be in close-circuit state, and the protection signal will be successfully transmitted to the control circuit 40 via the closed circuit; thus, the objective of power protection is accomplished. If the user selects the non-protection function of the power supply, the switcher circuit 30 will be in open-circuit state, and the protection signal will not be sent to the control circuit 40 as the circuit breaks; thereby, the objective of controlling load protection via the power protection circuit 20 is also accomplished.

Those described above are only the preferred embodiments of the present invention and not intended to limit the scope of the present invention. Any equivalent modification and variation according to the claims of the present invention is to be included within the scope of the present invention.

What is claimed is:

1. A load-protection control circuit of power supply, wherein said power supply comprises:

a power transformation circuit, which outputs a direct current to drive loads;

a control circuit, which is used to switch said power transformation circuit;

said power transformation circuit including a signal amplifier and comparator and said control circuit being electrically coupted to a power-protection circuit that has a voltage representing reference power, and wherein said power-protection circuit compares the direct current voltage from said power transformation circuit, which drives said loads, with said voltage representing reference power and generates an output signal to said control circuit in order to switch said power transformation circuit off, wherein said power-protection circuit and said control circuit are electrically coupled through a switcher circuit, which is selectively switched by a manual external switch to be in an open-circuit or a close-circuit state to select a protection function of the power supply whereby said protection signal is transmitted to said control circuit in a close-circuit state.

2. The load-protection control circuit of power supply according to claim 1, wherein a constant-voltage source provides said voltage representing reference power for said power-protection circuit.

3. The load-protection control circuit of power supply according to claim 1, wherein said external switch is installed on a panel of said power supply's housing.

4. The load-protection control circuit of power supply according to claim 1, wherein said control circuit is a pulse width modulator (PWM).

* * * * *